United States Patent [19]

Leonheart

[11] 4,232,565
[45] Nov. 11, 1980

[54] THROTTLE TWIST-GRIP CONTROL DEVICE

[75] Inventor: William H. Leonheart, San Carlos, Calif.

[73] Assignee: McMinnville Tool & Die, Inc., McMinnville, Tenn.

[21] Appl. No.: 934,623

[22] Filed: Aug. 17, 1978

[51] Int. Cl.² ............................................. B62K 23/04
[52] U.S. Cl. ...................................... 74/489; 74/104; 74/501 R; 74/504; 74/526
[58] Field of Search ............... 74/99 R, 104, 488, 489, 74/504, 501 R, 526

[56] References Cited

U.S. PATENT DOCUMENTS

| | | | |
|---|---|---|---|
| 454,983 | 6/1891 | Mills | 74/96 |
| 3,727,481 | 4/1973 | Nicholson | 74/516 X |
| 3,808,907 | 5/1974 | Yamaguchi | 74/501 R X |
| 3,828,624 | 8/1974 | Wiegand | 74/506 X |

FOREIGN PATENT DOCUMENTS 1036082  8/1958  Fed. Rep. of Germany ............. 74/489

Primary Examiner—Allan D. Herrmann
Attorney, Agent, or Firm—William D. Stokes

[57] ABSTRACT

A twist-grip cable control having cable movement parallel to the axis of the twist-grip rotation. A bell-crank lever is pivotally mounted within a housing with the inner portion of a Bowden cable connected to one arm of the lever. The other arm of the lever operatively engages a pin or finger member radially extending, fixedly mounted on a rotatable twist-grip sleeve. A guide is formed within a portion of the housing to receive the pin member and to limit the rotation of the sleeve. The device includes anchor means for securing one cable of the Bowden cable to the housing permitting the other cable to move relative to the anchored cable.

10 Claims, 3 Drawing Figures

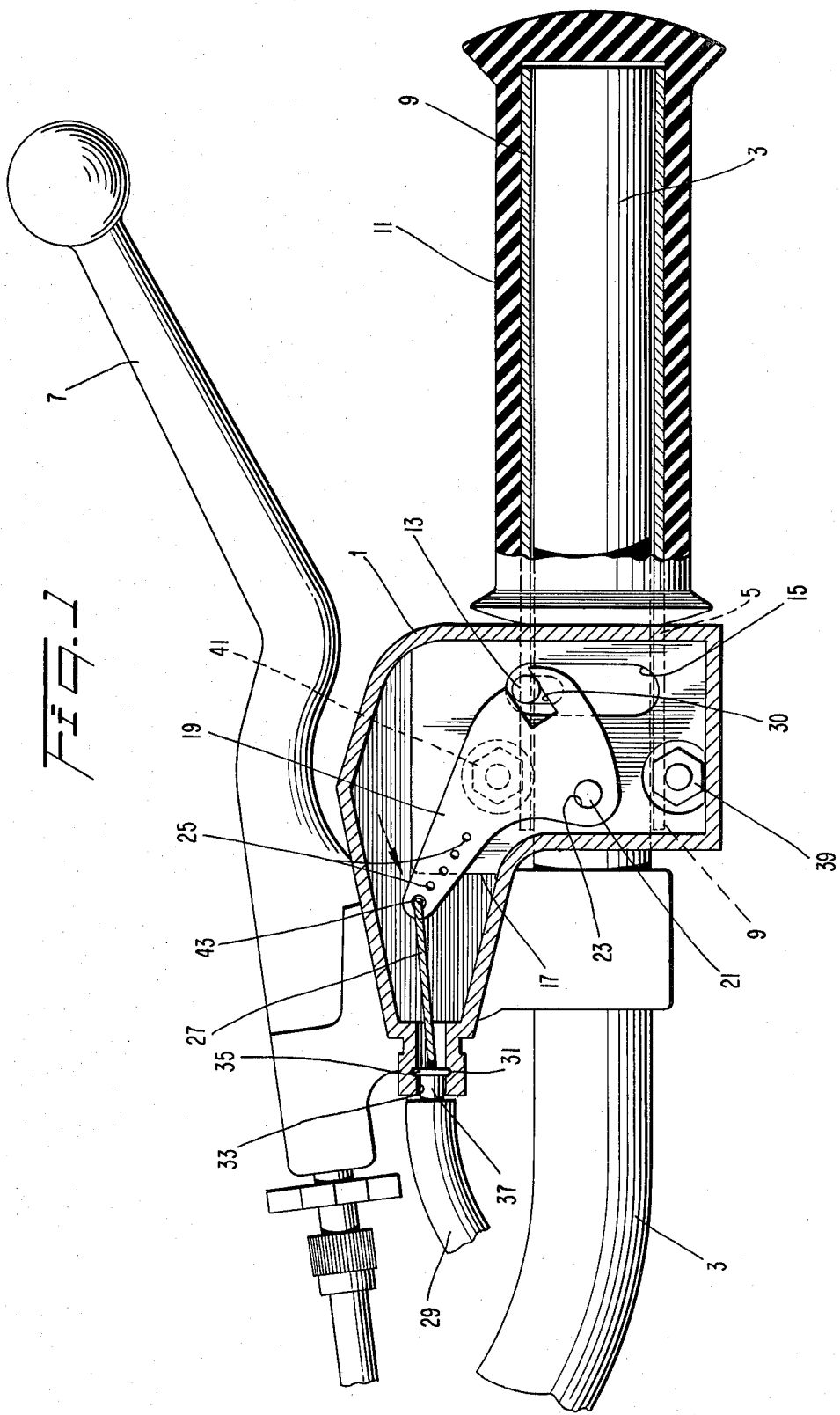

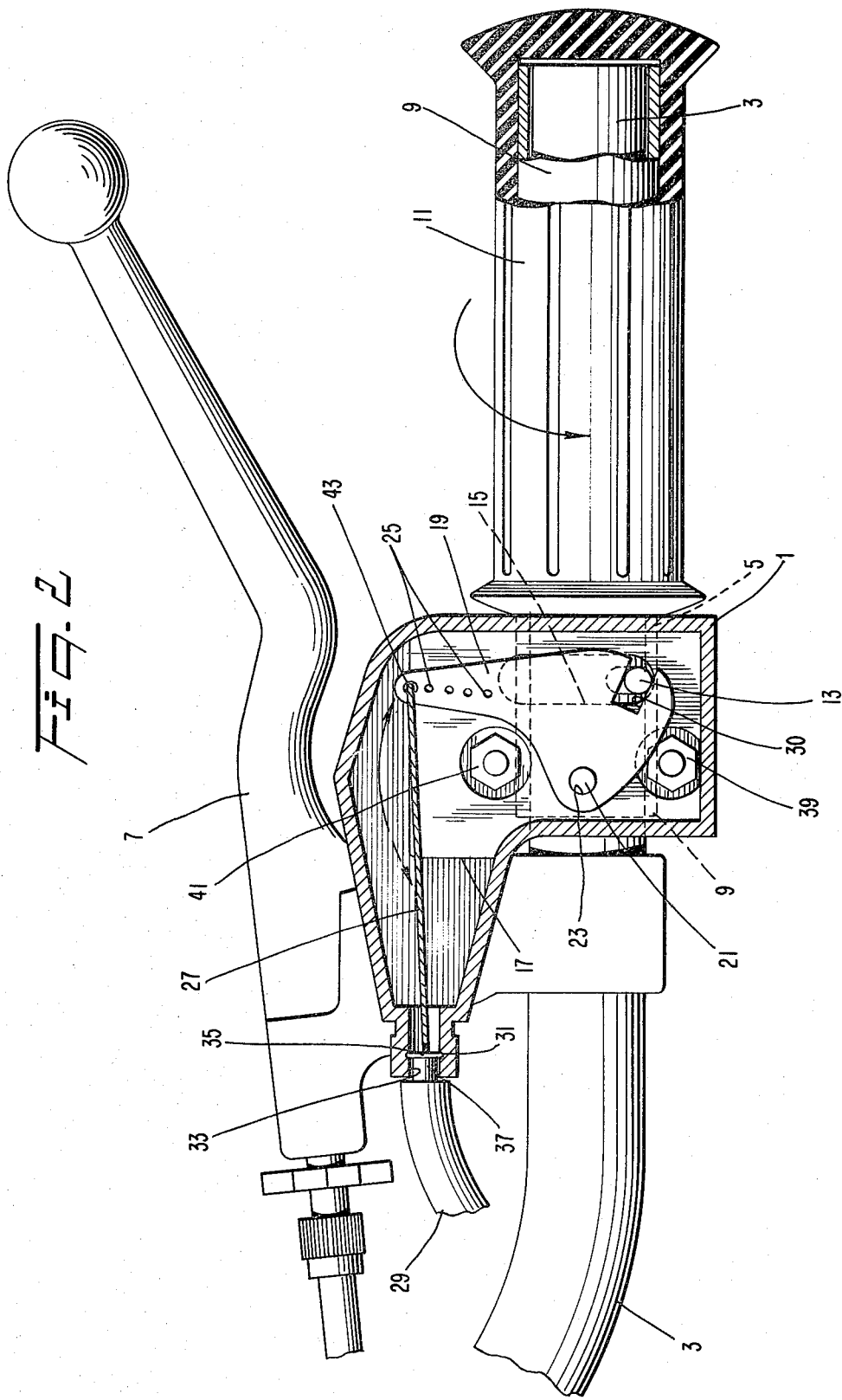

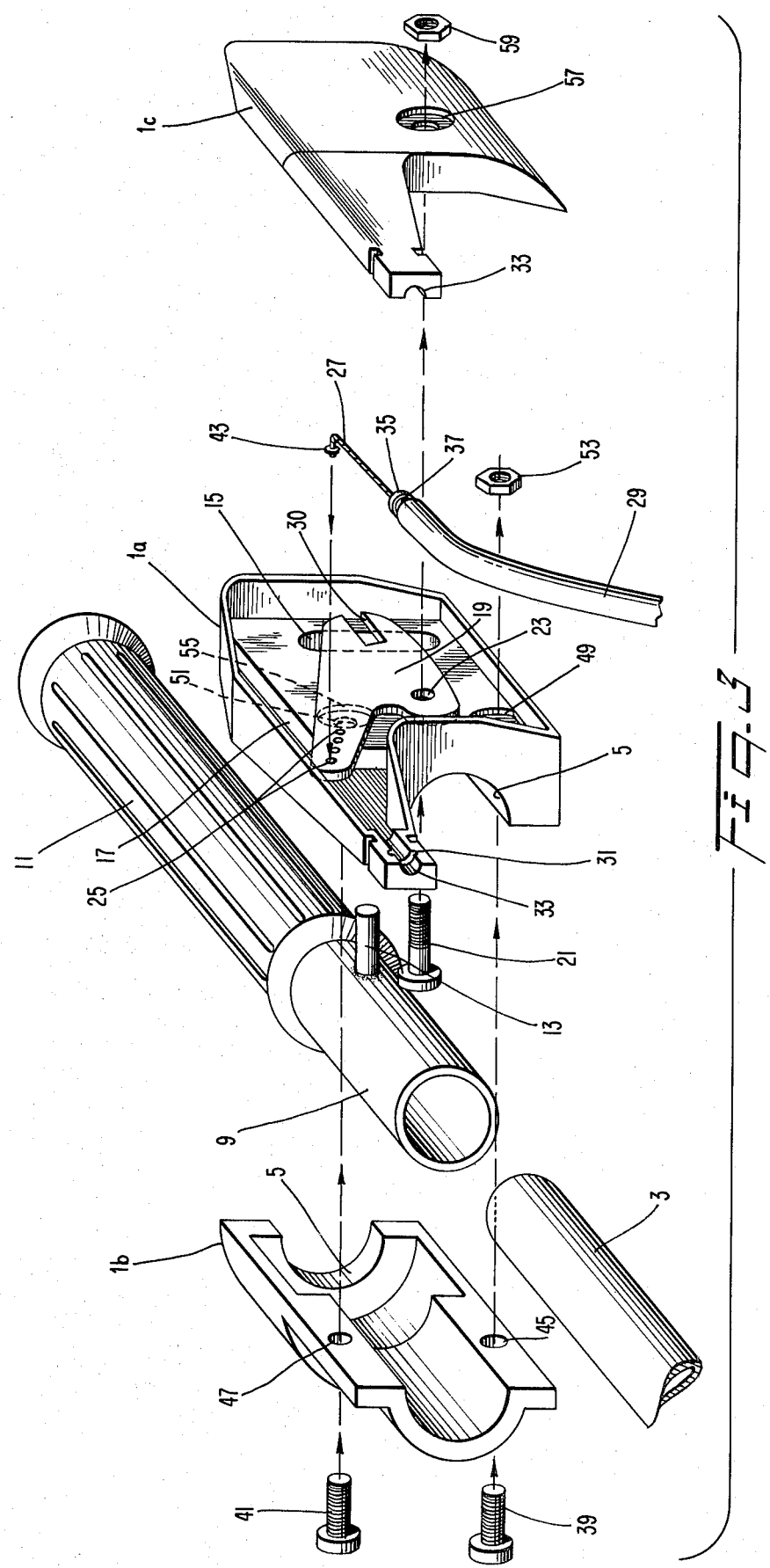

THROTTLE TWIST-GRIP CONTROL DEVICE

BACKGROUND OF THE INVENTION

This invention concerns actuators for remotely controlling operative mechanisms. More particularly, the invention relates to an improved motorcycle throttle control unit for mounting on the handle bar for actuating the carburetor.

Throttle control units of the prior art have generally taken one of several forms. U.S. Pat. No. 2,796,773 to Wooler et al describes a twist-grip throttle control in which a Bowden cable has its inner wire core radially attached to a rotatable sleeve. Rotation of the sleeve causes the wire to wind around the sleeve to control the throttle. Such devices suffer the disadvantage that the sleeve is subject to wear and breakage and no positive stop or limit on twist-grip rotation is provided. It will also be appreciated that the cable in such devices will become stretched after numerous uses of the twist-grip control requiring frequent readjustment or replacement. Moreover, in such devices there is no means provided for securing the outer sheath of the cable in the control housing.

It has been recognized by the art that linear movement of the cable parallel to the axis of rotation of the twist-grip provides a more uniform movement of the cable, however, none of the prior art devices have successfully provided such construction.

U.S. Pat. No. 1,834,724 to Nisbet describes a twist-grip throttle control in which a Bowden cable has its inner core attached to a movable slide disposed on the periphery of the twist-grip housing. A portion of the slide engages a helical opening formed in a rotatable sleeve attached to the twist-grip. When the grip is rotated, the slide is moved linearly along the helical opening and parallel to the twist-grip axis to effect a movement of the inner core of the cable. It will be observed that such construction requires a great deal of twist-grip rotation to effect a small amount of linear movement of the slide. Moreover, the pitch of the helical opening must be made different for each type of carburetor with which it is to be used, since different carburetors will need differing amounts of cable "throw" to be fully actuated. No provision is made for securing the outer sheath of the cable in the housing.

Similarly, U.S. Pat. No. 3,522,745 to Milosevic describes a twist-grip throttle control in which a Bowden cable has its inner core attached to an axially adjustable anchor. The ends of the anchor are captured within a pair of helical grooves formed on the interior of a rotatable sleeve. Rotation of the sleeve causes the anchor and cable to be linearly moved parallel to the axis of rotation of the sleeve. Unfortunately, while devices of this type provided great strides in the art, the construction suffered from similar disadvantage as described with respect to U.S. Pat. No. 1,834,724.

U.S. Pat. No. 4,019,402 issued to the present inventor, describes a twist-grip throttle control unit in which a Bowden cable has its inner and outer members attached to pivot arms urged apart by a rotatable cam movable by the twist-grip. This construction, while offering distinct advantages for specific carburetors, requires a different cam means for various types of carburetors. Moreover, no means are provided for securely locking the outer member or sheath of the cable to the control unit housing. As will become clear in the descriptions hereinafter, the present invention presents novel and useful improvements in control mechanisms of those known in the art.

The present invention successfully overcomes the disadvantages of the known devices by providing a twist-grip cable control which has linear movement of the cable parallel to the axis of rotation of the twist-grip. Further, the inventive device provides a twist-grip control in which the amount of twist-grip rotation necessary to effect a given movement of the cable is minimized. In addition, the twist-grip control of the present invention provides for ready adjustability of the amount of cable "throw" or movement so that the control may be used with various styles and makes of carburetors. The twist-grip control also provides for a limit on the grip rotation in order to prevent cable stretching. Still another advantage of the present invention is the provision of a cable control which has a positive locking means for securing the outer cable of a Bowden cable to the control housing so that the inner core of the cable may be forcefully released by counter-rotation of the grip in the event that it becomes jammed or kinked. The device of the invention further provides a positive cable member locking feature which insures a moisture and dust-proof seal to prevent contaminants from entering the control housing.

SUMMARY OF THE INVENTION

In summary, the invention provides a throttle twist-grip control which overcome the disadvantage of the prior art device. The inventive mechanism comprises a twist-grip control having a lever arm member pivotally mounted within a housing on a support. The inner portion of a Bowden cable is connected to one portion of the lever member while another part of the lever member engages a projecting member attached radially to a rotatable member. A guide in the lever arm support of the housing receives the projecting member so as to limit the rotational movement of the rotatable member. Cable anchoring means is provided preferably taking the form of an annular groove formed on the interior of a cable port in the housing and a mating collar formed on one of the cables of the Bowden cable.

The inventive mechanism is readily formed from a number of molded plastic or metal parts. The molded parts forming the control housing may be secured together by means of thread bolts or screws through openings formed in the molded parts. If a tamper-proof control housing is desired, the parts may be glued, welded or brazed together. The rotatable sleeve member is provided with a conventional twist-grip handle and fits over a fixed tubular member, forexample, a motorcycle handle bar or arm of a wheelchair. The housing includes a cylindrical opening designed to receive both the twist-grip assembly and the handle bar. Rotation of the twist-grip causes the projecting member to move within the guide in the lever arm support which results in pivotal movement of the lever member in a plane parallel to the axis of rotation of the rotatable member. The cable member attached to the lever arm is extended in response to the movement of the lever arm while the anchored cable member is rigidly secured to the housing. Such an arrangement allows the rotational movement of the twist-grip to be translated into linear movement of the unanchored cable member in a direction substantially parallel to the axis of rotation of the twist-grip. The lever arm member is provided with a number of attachment points for moving cable member which allow the operator to adjust the amount of cable movement without varying the degree of rotation of the rotatable member. Thus, the present invention may be used on various types and makes of carburetors while maintaining a uniform rotational angle from fully closed, to fully open, throttle operation. The guide means provides positive limits on the amount of twist-grip rotation, thus preventing cable stretching. Further, the provision of a positive cable member anchor means in the housing allows an operator to forcefully release a kinked or jammed cable by counter-rotation of the twist-grip. This constitutes an important safety feature since the operator can free a jammed throttle cable without any requirement for special tools. In addition, the cable member anchor means acts as a dust and moisture seal to prevent contaminants from entering into control housing.

BRIEF DESCRIPTION OF THE DRAWINGS

FIG. 1 is a plan view, partly in section, of the twist-grip cable control of the present invention, showing the control in its normally relaxed state;

FIG. 2 is a plan view, partly in section, showing the twist-grip cable control of the present invention in its fully actuated state;

FIG. 3 is an exploded view in perspective of the present invention showing the relationship of the various components comprising the twist-grip control.

DESCRIPTION OF THE PREFERRED EMBODIMENT

Referring now to the Figures in which like parts have the same number, there is shown a generally hollow housing 1 consisting of sections 1a, 1b and 1c mounted axially about a tubular handle bar unit 3 (fragmentally shown). A cylindrical guide opening 5 formed through housing 1 receives and guides handle bar unit 3 through the housing. Also shown, for illustrating the relationship thereof, is a brake lever 7, also axially mounted on handle bar 3. A rotatable sleeve member 9 is coaxially mounted on handle bar 3. In the illustrated embodiment, a handle bar gripping member 11 is shown mounted on rotatable sleeve member 9 to create a twist-grip assembly with the rotatable sleeve. Rotatable sleeve 9 is provided with a radially projecting pin or finger member 13. Pin 13 may be integrally formed with sleeve 9 or may be, for example, soldered, welded, brazed, or otherwise mounted on sleeve 9 in the many ways well known in the art. Alternatively, pin 13 may be threadedly engaged with sleeve 9. Pin 13 (and hence sleeve 9) is limited in its rotational movement by a slot or guideway 15 formed in the support partition, or wall, 17 of housing 1. A lever arm member 19 is pivotally mounted on support partition 17 in such manner that it moves in the same plans as the partition. Lever arm 19 is shown mounted on wall 17 by means of a pivot pin 21 through opening 23 in lever arm 19. Pivot pin 21 may be a screw, bolt, rivet or other means which enables the lever arm member 19 to freely move. Lever arm member 19 is of generally reversed "L" shaped configuration. A plurality of cable member anchoring holes 25 are formed in sequence in the vertical arm of lever arm 19. Anchor holes 25 are designed to receive and hold the free end of the moving cable member 27. Cable 29 is preferably of the Bowden cable type which is well-known in the art. In the general area of the conjunction of the two "arms" of the reversed "L" shaped lever member 19, a slot 30 is provided for sliding receipt of pin 13 mounted on rotatable sleeve 9 and extending through guide slot 15 in partition 17. In the prefferred embodiment the inner edges of slot 30 are radially curved to faciliatate the slowing of pin 13.

A cable port 33 is provided in housing 1. An annular channel or groove 31 is formed in the interior of port 33. Groove 31 is designed to matingly and lockingly accomodate a collar or flange 35 mounted on cable member 37. In addition to the cable members, the Bowden cable has a protective sheath (not numbered) covering thereover. As shown in FIG. 3, housing 1 comprises three sections 1a, 1b and 1c which are mounted together by means of bolts 39 extending through openings 45 in housing members 1a and 1b and secured by nuts 53, and a pivot pin 31 extending through openings 23 in partition 17 lever member 19 housing section 1c and threadedly engaged with nut 59.

Referring specifically to FIG. 2, there is shown a view similar to that of FIG. 1 except that twist-grip 11 and rotatable sleeve 9 have been rotated as indicated by the dotted lines. The rotation of sleeve 9 causes pin 13 to move downwardly in guide slot 15. The downward movement of pin 13 deposed in slot 30 causes a clockwise movement of lever arm 19 about pivot pin 21. The downward movement of pin 13 is limited by the dimensions of slot guide 15. As a result, the inner cable member 27 attached to lever arm 19 is moved relative to outer cable member 37. The linear distance moved by the cable member 27 is dependant upon the anchor point on which cable member 27 is attached as well as the degree of axial rotation of the rotatable member. The positions of cable member 27, crank 19, pin 13, and rotatable sleeve 9 as shown in FIG. 2 correspond to full throttle or "wide-open" actuation of an engine carburetor (not shown). Though the present invention is described in conjunction with its primary use as a carburetor control for a motorcycle, it is obvious that various other uses would occur to one skilled in the art of remote control cable devices, such as controls for snowmobiles, wheelchair, automobile consoles for paraplegics, and lawn mowers.

As illustrated in FIGS. 1 and 2, guide slot 15 acts to positively limit the degree of rotation of pin 13. Accordingly, the arc described by the cable member anchor points 25 of lever 19 is also positively limited. In a preferred embodiment of the invention, the length of guide slot 15 was such as to limit the degree of rotation of rotatable sleeve 9 and pin 13 to about 75 degrees. This degree of rotation required to go from a normal carburetor idle setting on, for instance, a motorcycle, to a full throttle position was found to provide smooth operation of the motorcycle. This degree of rotation also results in an amount of cable travel compatible with the requirements of substantially all carburetors. Since the axial rotation of twist-grip and lever movement is limited by slot 15, forcing of the grip 11 beyond their angle is substantially prevented. For this reason, the movable cable member 27 is not subject to the stretching forces caused by over-rotation of the grip as is common heretofore known mechanisms. It will be observed that while rotation of grip 11 causes a concomitant movement of lever arm 19, the direction of travel of cable member 27 is closely parallel to the axis of rotation of sleeve 9. Cable 29 is mounted in cable receiving port 33 in such a manner that cable members 37 and 27 are substantially parallel to the axis of rotation of sleeve 9. Parallel travel of the inner cable member 27 with respect to outer cable 37 and the axis of rotation is an advantage since the angle between the cable members will be kept to a minimum. This construction offers the advantage of providing decreased cable wear and a reduced tendency to kink or bind due to such wear.

An important feature of the invention is the provision of outer cable member securing or anchor means 31. As described hereinbefore, collar 35 of outer cable member 37 matingly fits within annular groove 31 formed within the cable receiving port 33 of housing 1. Collar 35 is securely mounted on the outer cable member 37. Outer cable member 37 is secured within cable port 33 against movement when, for example, inner cable member 27 is moved and in the event cable 29 is inadvertently jerked on. It will be observed that should inner cable 27 become jammed within outer cable member 37, counter-rotation of grip 11 and associated sleeve 9 and lever arm 19 will generally act to force inner cable 27 into outer cable member 37 thereby releasing the jammed or kinked portion. This is an important safety feature not found in prior art devices. In prior art devices, if the throttle cable should become jammed or kinked, the engine could become stuck in its maximum throttle positions resulting in great danger to the rider. Even where the operator is able to bring the engine under control, in prior art devices there is little that can be done to unjam a stuck Bowden cable in the known throttle control devices. It is important to the invention that fastening means are provided for the outer cable member. In the known devices, counterrotation of the grip would merely cause the jammed inner cable core and sheath to be forced as a unit out of the control housing. As will be appreciated, the present invention solves these problems simply and practically by providing a secure anchor for the cable at all times.

Another important feature of the invention is the provision of a plurality of anchor points 25 along one arm of lever 19 for securing an end of inner cable 27. Prior art twist-grip control mechanisms generally have provided only one fixed attachment point for the inner core of a cable. In known devices where some type of cable adjustability is provided, the adjustable means generally comprise a clamp which allows a cable to be tightened as it stretches over a period of time. However, due to the construction of these prior art controls, it was substantially impossible for the operator to change the anchor point of the cable in order to change the amount of cable core drawn for a given amount of twist-grip rotation. Such a lack of adjustability in the known devices is a disadvantage since it limits the types and makes of carburetors with which a control device can be used. Different types and makes of carburetors vary in the amount of cable motion or "throw" needed to vary the carburetor from an idle setting to a full throttle setting. Since prior art controls generally have a fixed cable anchor point and hence a fixed amount of cable "throw", a control must be designed to accomodate a particular type of carburetor for optimum performance. Alternatively, a control could be made with a large amount of cable throw, but this would result in less than optimum performance for most carburetors the control would be used with.

Since the present invention provides a plurality of inner cable member anchor points 25 disposed along one arm of crank member 19, an operator can vary the amount of inner cable 27 drawn for a given rotation of twist-grip 11 by varying the anchor point. An anchor point 25 for inner cable 27, such as shown in FIGS. 1 and 2, produces a maximum amount of cable "throw" for a given amount of twist-grip rotation. If the inner cable were to be mounted at one of the anchors 25 which are closer to lever pivot 21 a lesser amount of inner cable 27 would be drawn for the same amount of twist-grip rotation described above. Thus an operator may readily adjust the amount of inner cable 27 drawn for a given amount of twist-grip rotation, while still maintaining a substantially linear cable pull parallel to the axis of rotation of the twist-grip 11 and sleeve 9. As also illustrated in FIGS. 1 and 2, an anchor point collar means 43 is mounted on the end of inner cable member 27 and inserted into one of the anchor point openings 25 in lever arm 19. Of course, other means may be used as anchoring devices to secure inner means 27 to the lever arm, for example, various clamping devices.

Referring particularly to FIG. 3, there is shown an exploded perspective view of the preferred housing embodiment of the present invention. As illustrated, housing 1 is comprised of three sections 1a, 1b and 1c. Sections 1a and 1b have mating halves of the handle bar opening 5 formed therein. As described hereinabove, opening 5 is designed to snugly accomodate handle bar 3 and the portion of rotatable sleeve 9 comprising pin 13. Support partition 17 is shown fixedly mounted in housing section 1a. Partition 17 also has guide slot 15 formed therein. A mating housing member 1c is provided to fit over and seal housing section 1a. As will be apparent to those skilled in the art, housing members 1a, 1b and 1c may be formed from various types of materials, such as injection-molded plastic or aluminum. In the preferred embodiment, throttle grip 11 is formed from injection-molded nylon and lever arm member 19 preferably formed from a self-lubricating material.

To assemble the device of the invention, handle bar 3 and rotatable sleeve 9 are assembled together and placed between the semi-circular openings 5 of housing members 1a and 1b. Sleeve 9 is rotated so as to cause pin member 13 to project through guide slot 15 in partition 17 of housing member 1a. Pivot pin 21 is then passed through opening 23 of partition 17. Lever member 19 is then mounted on pivot pin 21 projecting through opening 23 in partition 17. Housing portions 1a and 1b, along with sleeve 9, handle bar 3 and grip 11 are then secured together by means of threaded bolts 39 passing through the respectively aligned openings 45 formed in housing portions 1b and 1a, respectively. Nuts 53 are then threaded over the exposed ends of bolts 39 to secure portions 1a and 1b together.

Lever arm 19 is aligned so that the slot 30 embraces projecting finger pin 13 of sleeve 9. Cable 29 is then inserted in the cable receiving port 33 of housing member 1a. Collar 35 on outer cable member 37 is fitted into groove 31. The inner cable member 27 is then attached to the desired anchor point 25 on lever arm 19 by means of a fastening means 43. Cover member 1c is mated with housing member 1a in such manner that cable receiving port 33 of 1c and associated annular groove (not shown) engage the collar 35 of cable 29 to lock the cable securely within the intake receiving port 33 of housing portions 1a and 1c. When completely assembled, pivot pin 21 will project through opening 57 in housing member 1c. A nut 59 is mounted on the threaded end of pivot pin 21 to secure housing member 1c to housing member 1a to complete the assembly of the control unit.

It can thus be seen that the present invention provides a simple and practical readily assembled twist-grip control unit made of molded materials and having many advantages in operation over prior art devices. While the twist-grip cable control of the present invention has been described in considerable detail, it is understood that various changes and modifications may occur to persons of ordinary skill in the art without departing from the spirit and scope of the invention as is defined in the appended claims.

What is claimed is:

1. A remote control actuator for translating rotational angular movement into linear movement comprising: a housing; support partition means within said housing having a slot therethrough; a rotatable member arranged for rotational movement about an axis; projecting means rigidly mounted on said rotatable member and extending through said slot in said partition whereby the degree of rotation of the rotatable member is determined by the limits of said slot; a lever arm pivotally mounted on said support partition; means on said lever arm for movably engaging said projecting means whereby rotation of the rotatable member will cause said lever arm to move in a plane substantially parallel to the axis of rotation of the rotatable member; control actuator cable means including an inner cable member slidably movable with respect to a co-axially arranged outer cable member, said inner cable member being anchored upon and movable with said lever arm operative to oppose the movement of the outer cable member when said inner cable member is moved by said lever arm permitting relative movement between said cable members as said inner cable member is shifted in response to movement of said lever arm.

2. The remote control actuator of claim 1 wherein the lever arm has a plurality of anchoring means for said inner cable member whereby the linear movement of the cable means may be varied without changing the degree of rotation of said rotatable member.

3. The remote control actuator of claim 1 wherein said housing comprises three sections, the support partition being fixedly mounted in the center section of said housing.

4. The remote control actuator of claim 1 wherein said actuator includes locking means for anchoring said outer cable member to said housing.

5. The locking means of claim 4 wherein said housing comprises a cable port; an annular groove in said port; and a collar flange on said outer cable means sealingly engageable within said annular groove.

6. A remote control actuator for translating rotational angular movement into linear movement comprising:
a housing having a hollow interior including a support partition and a cable receiving port, said support partition having a guide slot formed therein and said cable receiving port including cable locking means formed therein;
a lever arm member pivotally mounted on said support partition;
a rotatable member arranged for rotational movement about an axis; a radially projecting pin member fixedly mounted on said rotatable member, said pin member projecting through said guide slot in said support partition; means in said lever arm for receiving said pin member in such a manner that rotational movement of said rotatable member imparts movement of said lever about its pivot;
control actuator cable means disposed within said cable port and including an inner cable member movable with respect to a coaxially arranged outer member, said inner cable member being anchored to said lever arm for movement therewith and said outer member being anchored to said cable locking means, the length of said guide slot defining the length of linear movement of said inner cable member.

7. The remote control actuator of claim 6 wherein said cable locking means comprise an annular groove formed on an interior portion of said cable port for matingly receiving a collar member formed on said outer cable member.

8. The remote control actuator of claim 6 wherein said lever arm member includes a plurality of inner cable member anchor points formed thereon, whereby the linear movement of the cable means may be varied without changing the degree of rotation of said rotatable member.

9. The remote control actuator of claim 6 wherein said lever arm member is generally reverse "L" shaped having two arms, the horizontal arm of which is pivotally mounted on said support partition; the vehicle arm thereof having anchoring means thereon for said cable means; and the juncture of said arms having slot means therein for slidably receiving the projecting pin member mounted on said rotatable sleeve.

10. In a motorcycle twist-grip control assembly the combination comprising, a rotatable sleeve member adapted to be received over the free end of the motorcycle handle bar and to be rotatable with respect thereto; a housing adapted to be fixedly secured to said handle bar and having an opening therein receiving said handle bar and sleeve member; said rotatable sleeve having a radially extending pin mounted thereon; a support partition means fixedly mounted in said housing having a guide slot therein through which said radial pin extends, said guide slot limiting the degree of rotation of said rotatable sleeve; lever arm means pivotally mounted on said support partition; means on said lever arm for operatively engaging said radially extending pin member whereby rotation of the rotatable sleeve will cause said lever arm to pivot; a Bowden cable, the inner cable member thereof being anchored upon and movable with said lever arm; and anchor means on said housing for the other of said cable members permitting relative movement of the first cable member in response to movement of said lever arm in response to rotation of said rotatable sleeve, said movement of the first cable member being linear and limited by the length of said slot.

* * * * *